United States Patent
Sasaki et al.

(10) Patent No.: US 12,276,149 B2
(45) Date of Patent: Apr. 15, 2025

(54) PROTECTOR WITH SENSOR AND METHOD OF MANUFACTURING THE SAME

(71) Applicants: NISHIKAWA RUBBER CO., LTD., Hiroshima (JP); AISIN CORPORATION, Aichi (JP)

(72) Inventors: Yoichiro Sasaki, Hiroshima (JP); Daisuke Hayashi, Hiroshima (JP); Wataru Hattori, Kariya (JP)

(73) Assignees: NISHIKAWA RUBBER CO., LTD., Hiroshima (JP); AISIN CORPORATION, Kiriya (JP)

( * ) Notice: Subject to any disclaimer, the term of this patent is extended or adjusted under 35 U.S.C. 154(b) by 0 days.

(21) Appl. No.: 17/853,556

(22) Filed: Jun. 29, 2022

(65) Prior Publication Data

US 2023/0003071 A1    Jan. 5, 2023

(30) Foreign Application Priority Data

Jul. 1, 2021 (JP) ................................ 2021-109938
Apr. 22, 2022 (JP) ................................ 2022-071189

(51) Int. Cl.
*E05F 15/46* (2015.01)
*G01D 11/24* (2006.01)

(52) U.S. Cl.
CPC .............. *E05F 15/46* (2015.01); *G01D 11/24* (2013.01); *E05Y 2400/54* (2013.01); *E05Y 2800/455* (2013.01); *E05Y 2900/531* (2013.01)

(58) Field of Classification Search
CPC ..... E05F 15/44–2015/487; E05F 15/42; E05Y 2800/30; E05Y 2800/31; E05Y 2800/33
See application file for complete search history.

(56) References Cited

U.S. PATENT DOCUMENTS

| | | | |
|---|---|---|---|
| 6,339,305 B1 * | 1/2002 | Ishihara | E05F 15/44 49/27 |
| 6,668,660 B2 * | 12/2003 | Ishihara | E05F 15/44 73/756 |
| 2013/0307567 A1 * | 11/2013 | Bolbocianu | G01V 3/02 324/661 |

(Continued)

FOREIGN PATENT DOCUMENTS

| | | | | |
|---|---|---|---|---|
| CN | 112096212 A | * | 12/2020 | .............. E05F 15/44 |
| JP | H0699742 A | | 4/1994 | |

(Continued)

*Primary Examiner* — Daniel P Cahn
*Assistant Examiner* — Patrick B. Ponciano
(74) *Attorney, Agent, or Firm* — Holtz, Holtz & Volek PC

(57) ABSTRACT

A first end of an insert fills up a space of a hollow part of a protector, and a second end includes an insulator to insulate a first wire connection part where a first leg of a resistor is piled on a first core wire from a second wire connection part where a second leg of the resistor is piled on a second core wire. Die-molding material covers the insulator, the first and second core wires, the resistor, the first and second legs, and the first and second wire connection parts. The insulator has a tabular shape, and the insulator has left and right side ends exposed from a part covered with the die-molding material. The insert includes a second protrusion on a connection part between the first and second ends of the insert. The second protrusion is closer to an inner side part than an inner surface of the insulator.

11 Claims, 16 Drawing Sheets

(56) References Cited

U.S. PATENT DOCUMENTS

| | | | |
|---|---|---|---|
| 2014/0339842 A1* | 11/2014 | Kawaguchi | B60J 10/86 296/1.04 |
| 2015/0267457 A1 | 9/2015 | Matsumoto et al. | |
| 2019/0149151 A1* | 5/2019 | Okada | E05F 15/44 200/211 |
| 2019/0210259 A1* | 7/2019 | Hattori | B60J 10/273 |
| 2019/0264488 A1 | 8/2019 | Hattori et al. | |
| 2021/0006136 A1 | 1/2021 | Maruyama et al. | |
| 2021/0010827 A1 | 1/2021 | Maruyama et al. | |
| 2021/0021178 A1* | 1/2021 | Maruyama | E05F 15/44 |
| 2021/0095512 A1* | 4/2021 | Matsumoto | B60J 10/273 |
| 2021/0109246 A1 | 4/2021 | Matsumoto et al. | |
| 2021/0324670 A1* | 10/2021 | Matsumoto | E05F 15/44 |
| 2021/0324671 A1 | 10/2021 | Ikeda et al. | |

FOREIGN PATENT DOCUMENTS

| | | | |
|---|---|---|---|
| JP | 2007190981 A | | 8/2007 |
| JP | 2013179007 A | | 9/2013 |
| JP | 2014229408 A | * | 12/2014 |
| JP | 2015020548 A | * | 2/2015 |
| JP | 2015174632 A | | 10/2015 |
| JP | 2015212998 A | | 11/2015 |
| JP | 2016004702 A | | 1/2016 |
| JP | 6110728 B2 | * | 4/2017 |
| JP | 2017204361 A | | 11/2017 |
| JP | 2019091618 A | | 6/2019 |
| JP | 2019119420 A | | 7/2019 |
| JP | 2019145466 A | | 8/2019 |
| JP | 2020030114 A | | 2/2020 |
| JP | 2021012798 A | | 2/2021 |
| JP | 2021015690 A | | 2/2021 |
| JP | 2021018840 A | | 2/2021 |
| JP | 2021018978 A | | 2/2021 |
| JP | 2021062665 A | | 4/2021 |

* cited by examiner

US 12,276,149 B2

PROTECTOR WITH SENSOR AND METHOD OF MANUFACTURING THE SAME

REFERENCE TO RELATED APPLICATIONS

This application claims the benefit under 35 USC § 119 of JP Patent Applications JP 2021-109938 filed Jul. 1, 2021 and JP 2022-071189 filed Apr. 22, 2022, the entire disclosure of which is incorporated herein by reference.

BACKGROUND OF THE INVENTION

The present invention relates to a protector with a sensor and a method of manufacturing the same. When an object including a finger is disposed between a door opening of an automobile body of an automobile and a panel which moves between at least two positions to open and close the opening, and makes contact with a hollow part of the protector when the panel is moved towards a closed position, an electric signal provides an indication that the object is in the opening. The panel includes doors such as a sliding door, a back door, and a sunroof, for example, of a wagon and a station wagon.

A protector 10 with a sensor couples to a flange F of a sliding door 1 or the back door, for example, of the wagon illustrated in FIG. 10. A protector 20 with a sensor couples to the flange F of a sunroof 2 of the automobile illustrated in FIG. 11. The sliding door 1 and the sunroof 2 move between at least two positions to open and close the opening.

The flange F protrudes toward a front part of the automobile body from a front edge of the sliding door 1. The protector 10, which couples to the flange F, protrudes toward the front part of the automobile body and extends in an upper and lower direction of the automobile body as illustrated in FIG. 12.

In this connection, Japanese unexamined Patent Publication No. 2021-062665 is directed to the protector 10 illustrated in FIG. 13 and FIG. 14. The protector 10 includes an installation base member 11 and a hollow part 12. The installation base member 11 couples to the flange F on the front edge of the sliding door 1, and has a substantially U-shaped cross section including an inner-cabin side wall 11a, an outer-cabin side wall 11b, and a connecting wall 11c. The hollow part 12 is integrally formed with the installation base member 11. The hollow part 12 includes a sensor (pressure sensitive sensor) S. When the object including part of a human body, e.g. fingers, hands, or legs is disposed between the sliding door 1 (may also be a front door or a side door) and the opening, and makes contact with the hollow part 12, the electric signal provides the indication that the object is in the opening.

An outer peripheral surface of the hollow part 12 is an outer coat 12a. The outer coat 12a has a substantially U-shaped cross section and has an inner-cabin side end 12b and an outer-cabin side end 12c. The inner-cabin side end 12b is connected with a right side part of the installation base member 11 and the outer-cabin side end 12c is connected with a left side part, and are at a distance from each other along the installation base member 11.

On a lower part of the protector 10, a channel part 13 is integrally formed with the inner-cabin side wall 11a. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a seal 16, which has a shape of a lip, is formed on the outer-cabin side wall 11b.

The sensor S is fixed in the hollow part 12. The hollow part 12 has two core wires (electrode wires) 31, 32, rubber like elastic bodies (first and second conductive parts) 34, 35, and a space 33. The core wires 31, 32 extend in an upper and lower direction, or a direction parallel to a peripheral edge of the opening, of the hollow part 12 and are embedded in the rubber like elastic bodies 34, 35. The rubber like elastic bodies 34, 35 have electric conductivity. The space 33 is positioned between the rubber like elastic bodies 34, 35. When the object is disposed between the sliding door 1 and the opening, and makes contact with the hollow part 12 when the sliding door 1 is moved towards the closed position, the rubber like elastic bodies 34, 35 come into contact with each other and the two core wires 31, 32 short-circuit. Resultant electric signal is transmitted to a control unit 40 by leads 36, 36, and as a result, the object is detected. The leads 36, 36 are connected with the two core wires 31, 32 in a lower side terminal part of the protector 10. The leads 36, 36 are covered with insulator and are tied by a wire harness W. Top ends of the leads 36, 36 are bared from covered parts 37, 37 and are naked wires.

The rubber like elastic bodies 34, 35 include the first conductive part 34 on an upper part of the hollow part and the second conductive part 35 on a lower part of the hollow part. The first conductive part 34 has a concave shape and the second conductive part 35 has a convex shape in cross section of the hollow part 12. The first and second conductive parts 34, 35 are shaped and positioned in a manner that the space 33, positioned between the first and second conductive parts 34, 35, has a substantially U-shaped cross section, the space 33 has a substantially uniform width in cross section, and an opening of the U-shaped cross section faces the installation base member 11. This configuration widens a range for the sensor S to detect the objects.

Japanese unexamined Patent Publication No. 2015-174632 discloses an upper side terminal part of the protector 10 illustrated in FIG. 15. In the upper side terminal part, the two core wires 31, 32 extend in the direction parallel to the peripheral edge of the opening, that is right direction in FIG. 15 relative to the sheet, and are connected with legs of a resistor 39 by resistance welding or soft soldering. Also, an insert 26 fills up the space 33. Then, wire connection parts M, the insert 26, and the resistor 39 are embedded in a die-molded part formed by die molding and are not exposed. In FIG. 15, a dotted line indicates the die-molded part.

Unfortunately, however, the insert 26 can rattle and shift from a predetermined position inside a die (illustration omitted) under an injection pressure of a molten resin into the die during the die molding. This occurs when the die does not fix the insert 26 inside the die.

In this connection, Japanese unexamined Patent Publication No. 2019-091618 is directed to a touch sensor unit and a method of manufacturing the same where the die fixes the insert to eliminate positional unevenness of the insert.

As illustrated in FIGS. 16 and 17, the touch sensor unit includes an insulation tube 41, a first electrode wire 42, a second electrode wire 43, a first separator 45, an insertion part 46, and a housing body part 47. The electrode wires 42, 43 are provided in the insulation tube 41 in a spiral shape. The first separator 45 has a first end and a second end. The insertion part 46 extends from the first end of the first separator 45 and is inserted into the insulation tube 41. The housing body part 47 has a first side part and a second side part, and is formed on the second end of the first separator 45 to store a resistor R.

The housing body part 47 includes a first bottom wall 47a, a second bottom wall 47b, a side wall 47c, and a partition wall 47d. The side wall 47c rises from the first bottom wall 47a and the second bottom wall 47b. The partition wall 47d is formed inside the housing body part 47 and extends in a longitudinal direction of the first separator 45.

The first side part of the housing body part 47 has the resistor R and a first caulking member SW stored between a first surface of the partition wall 47d and the side wall 47c. The first caulking member SW connects a first leg of the resistor R with the first electrode wire 42, and is caulked. The second side part of the housing body part 47 has a second caulking member SW stored between a second surface of the partition wall 47d and the side wall 47c. The second caulking member SW connects a second leg of the resistor R with the second electrode wire 43, and is caulked. The partition wall 47d between the first and second caulking members SW prevents short-circuiting. The first bottom wall 47a has a concave part 47e recessed into an inner side from an outer side of the housing body part 47.

A first molded resin part 48, formed by die molding, covers the first separator 45. In FIG. 16, the dotted line indicates an outer coat of the first molded resin part 48.

The die supports part of the first separator 45 during the die molding, to prevent the first separator 45 from rattling.

Unfortunately, however, the commercial product of Japanese unexamined Patent Publication No. 2019-091618 illustrated in FIGS. 18A, 18B includes a plurality of parts exposed from the first molded resin part 48. The exposed parts, that is shaded parts in FIGS. 18A, 18B, include parts of the second bottom wall 47b, parts of the side wall 47c, part of the partition wall 47d, and part of the concave part 47e, and spoil appearance.

In addition, the second end of the first separator 45 includes the first bottom wall 47a, the second bottom wall 47b, the side wall 47c, the partition wall 47d, and the concave part 47e. In other words, the second end is part of the first separator 45 other than the insertion part 46, and protrudes from the insulation tube 41. The second end has a complicated structure of the components and is more three-dimensional and harder to hold than a separator that has a tabular shape, to degrade operability.

In addition, the second end of the first separator 45, which is larger than the resistor R, is further enlarged when covered by the first molded resin part 48. In addition, thermal compression of the first separator 45 leads to appearance of a concave part on the first molded resin part 48.

To solve the above problems, it is an object of the present invention to provide a protector that has a simple configuration, an improved operability, and an unspoiled appearance with a sensor.

SUMMARY OF THE INVENTION

To achieve the above object, an aspect of the present invention provides a protector (30) with a sensor. The protector (30) includes an installation base member (11) and a hollow part (12). The installation base member (11) couples to a flange (F) of at least one of a peripheral edge of a panel (1, 2) of an automobile or a peripheral edge of a door opening of an automobile body of the automobile. The panel (1, 2) moves between at least two positions to open and close the opening. The hollow part (12) is unified with the installation base member (11). The hollow part (12) has a shape of a tube. The hollow part (12) has first and second core wires (31, 32), first and second conductive parts (34, 35), and a space (33). Each of the first and second conductive parts (34, 35) have a respective one of the first and second core wires (31, 32) embedded. The space (33) is positioned between the first and second conductive parts (34, 35). The installation base member (11) and the hollow part (12) form an extrusion-molded part.

When an object is disposed between the panel (1, 2) and the opening, and makes contact with the hollow part (12) when the panel (1, 2) is moved towards a closed position, an electric signal provides an indication that the object is in the opening.

In a terminal part of the extrusion-molded part, the first and second core wires (31, 32) extend in a direction parallel to the peripheral edge of the opening, and the first and second core wires (31, 32) are connected with first and second legs (39a, 39b) of a resistor (39). A first end of an insert (50) is inserted in and fills up the space (33). A second end of the insert (50) includes an insulator (60) to insulate a first wire connection part (M1) from a second wire connection part (M2). The insert (50) is made of a non-conductive material. The first wire connection part (M1) is where the first leg (39a) is piled on a top end of the first core wire (31). The second wire connection part (M2) is where the second leg (39b) is piled on a top end of the second core wire (32). Die-molding material (K) covers the insulator (60), the first and second core wires (31, 32), the resistor (39), the first and second legs (39a, 39b), and the first and second wire connection parts (M1, M2) on the second end of the insert (50).

The insulator (60) has a tabular shape. The insulator (60) has a left side end (61) and a right side end (62) exposed from a part covered with the die-molding material (K).

It is to be noted that the "electric signal" includes a change by short between the two core wires, and a change in capacitance.

In addition, according to an aspect of the present invention, the insulator (60) has an outer surface and an inner surface closer to the installation base member (11) than the outer surface. The inner surface has a concave part (63) to position the resistor (39).

In addition, according to an aspect of the present invention, the outer surface of the insulator (60) is closer to an outer side part than an outer surface of the first end of the insert (50) by a distance (D).

In addition, according to an aspect of the present invention, the outer surface of the insulator (60) is flush with an outer surface of the first end of the insert (50). The insert (50) includes a first protrusion (65) on a connection part between the first and second ends of the insert (50). The first protrusion (65) is closer to an outer side part than the outer surface of the insulator (60).

In addition, according to an aspect of the present invention, the insert (50) includes a second protrusion (66) on a connection part between the first and second ends of the insert (50). The second protrusion (66) is closer to an inner side part than the inner surface of the insulator (60).

In addition, according to an aspect of the present invention, the space (33) has a substantially U-shaped cross section and an opening of the U-shaped cross section faces the installation base member (11). The first end of the insert (50) has the substantially same shape as the space (33).

In addition, an aspect of the present invention provides a method of manufacturing a protector (30) with a sensor. The protector (30) includes an installation base member (11) and a hollow part (12). The installation base member (11)

couples to a flange (F) of at least one of a peripheral edge of a panel (1, 2) of an automobile and a peripheral edge of a door opening of an automobile body of the automobile. The panel (1, 2) moves between at least two positions to open and close the opening. The hollow part (12) is unified with the installation base member (11). The hollow part (12) has a shape of a tube. The hollow part (12) has first and second core wires (31, 32), first and second conductive parts (34, 35), and a space (33). Each of the first and second conductive parts (34, 35) have a respective one of the first and second core wires (31, 32) embedded. The space (33) is positioned between the first and second conductive parts (34, 35). The installation base member (11) and the hollow part (12) form an extrusion-molded part.

When an object is disposed between the panel (1, 2) and the opening, and makes contact with the hollow part (12) when the panel (1, 2) is moved towards a closed position, an electric signal provides an indication that the object is in the opening.

In a terminal part of the extrusion-molded part, the first and second core wires (31, 32) extend in a direction parallel to the peripheral edge of the opening, and the first and second core wires (31, 32) are connected with first and second legs (39a, 39b) of a resistor (39). A first end of an insert (50) is inserted in and fills up the space (33). A second end of the insert (50) includes an insulator (60) to insulate a first wire connection part (M1) from a second wire connection part (M2). The insert (50) is made of a non-conductive material. The first wire connection part (M1) is where the first leg (39a) is piled on a top end of the first core wire (31). The second wire connection part (M2) is where the second leg (39b) is piled on a top end of the second core wire (32). The insulator (60), the first and second core wires (31, 32), the resistor (39), the first and second legs (39a, 39b), and the first and second wire connection parts (M1, M2) on the second end of the insert (50) are die molded.

The method includes: forming the insulator (60) into a tabular shape; positioning the insulator (60) on a die (100) with a left side end (61) and a right side end (62) of the insulator (60) abutted on an inner surface of the die (100); pouring die-molding material (K) into the die (100); and die molding the second end of the insert (50).

In addition, according to an aspect of the present invention, the method further includes: providing an inner die (103) between an upper die (101) and a lower die (102) of the die (100), the inner die (103) having first and second projections (103a, 103b); abutting top ends of the first and second projections (103a, 103b) on an inner surface of the insulator (60) closer to the installation base member (11) than an outer surface of the insulator (60); positioning the second leg (39b) of the resistor (39) between the first and second projections (103a, 103b) with an entire circumference of the second leg (39b) surrounded by a space (Q); and pouring the die-molding material (K) into the space (Q).

Symbols in parentheses show constituents or items corresponding to the drawings.

According to the present invention, the hollow part of the protector has the shape of the tube. The hollow part has the first and second core wires, the first and second conductive parts, and the space. Each of the first and second conductive parts have the respective one of the first and second core wires embedded. The space is positioned between the first and second conductive parts. The first end of the insert is inserted in the hollow part. The second end of the insert includes the insulator that has the tabular shape and protrudes from the hollow part after the insert is fixed in the hollow part. This insulator is easier to hold for die-molding operators, and improves operability. In addition, merely touching the hollow part and this insulator allows the operators to understand the angle of the insert without the need for visual confirmation and to position the insert on the die at once.

In addition, the die-molding material covers the insulator, the first and second core wires, the resistor, the first and second legs, and the first and second wire connection parts on the second end of the insert. The insulator that has the tabular shape reduces the thickness, or dimension, covered with the die-molding material as compared with a conventional protector illustrated in FIGS. 16 to 18. This prevents thermal shrinkage after die molding from spoiling appearance, including sink marks on an outer surface. In addition, the insulator that has the tabular shape is simple in configuration and reduces volume.

In addition, the insulator has merely the left side end and the right side end exposed from the part covered with the die-molding material. This configuration improves appearance of the protector as compared with the conventional protector illustrated in FIGS. 16 to 18.

In addition, the inner surface of the insulator has the concave part to position the resistor. This configuration simplifies positioning of the insulator relative to the resistor.

In addition, the outer surface of the insulator is closer to the outer side part than the outer surface of the first end of the insert by the distance. Alternatively, the outer surface of the insulator is flush with the outer surface of the first end of the insert, the insert includes the first protrusion on the connection part between the first and second ends of the insert, and the first protrusion is closer to the outer side part than the outer surface of the insulator. Alternatively, the insert includes the second protrusion on the connection part between the first and second ends of the insert, and the second protrusion is closer to the inner side part than the inner surface of the insulator.

The distance, the first protrusion, or the second protrusion functions as a stopper of the insert when the first end of the insert is inserted in the hollow part, and simplifies positioning of the insert.

This configuration prevents the first end of the insert from advancing too deep inside the space when the first end is inserted from an end of the extrusion molded part and positions the insert on an appropriate position.

In addition, the space has the substantially U-shaped cross section, the opening of the U-shaped cross section faces the installation base member, and the first end of the insert has the substantially same shape as the space. This configuration achieves smooth insertion of the first end and prevents the inserted first end from coming off easily.

In addition, the method includes: forming the insulator into the tabular shape; positioning the insulator on the die with the left side end and the right side end of the insulator abutted on the inner surface of the die; pouring die-molding material into the die; and die molding the second end of the insert. The insulator subjected to the die molding has merely the left side end and the right side end exposed from the surface of the protector. This improves appearance of the protector. In addition, the die in contact with the left side end and the right side end supports the insulator under the die molding, to achieve stable die molding of the insulator.

In addition, the method further includes: providing the inner die that has the first and second projections between the upper die and the lower die of the die; abutting the top ends of the first and second projections on the inner surface of the insulator; positioning the second leg of the resistor between the first and second projections with the entire circumference of the second leg surrounded by the space; and pouring the die-molding material into the space. In other words, the die-molding material flows into the space between the insulator and the resistor as well and stably supports the resistor.

In addition, the inner die that has the first and second projections and are provided between the upper and lower dies achieves downgage of a thick part of a die-molded part. This further prevents the thermal shrinkage after the die molding from spoiling the appearance, including the sink marks on the outer surface.

DETAILED DESCRIPTION

Figure 1:
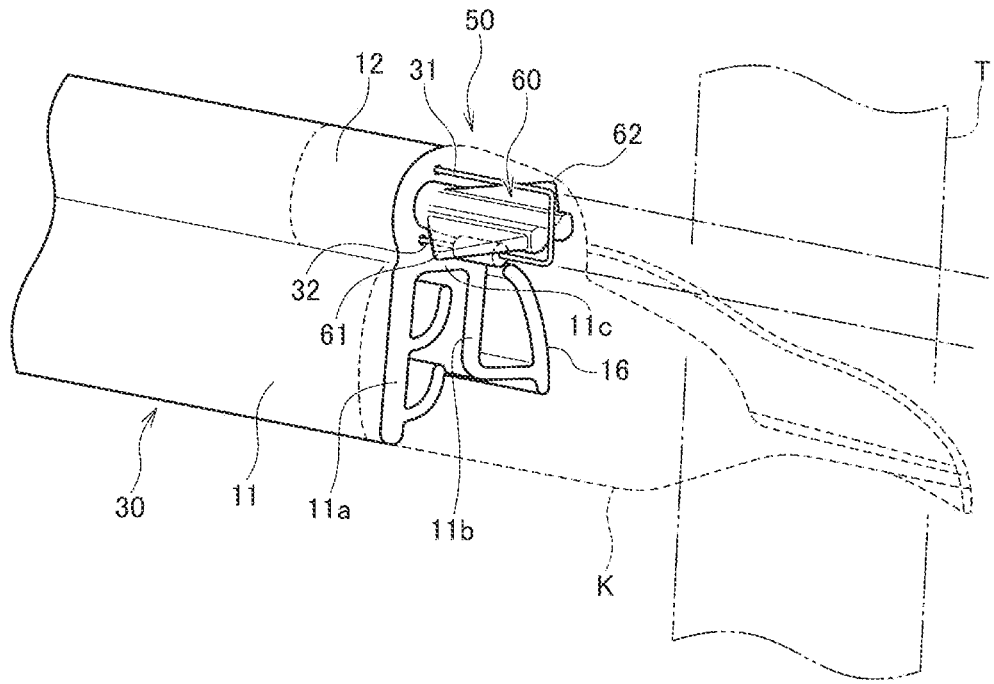
FIG. 1 is a perspective view of the principal components of an upper terminal part of a protector according to an embodiment of the present invention with a sensor.

Referring to the Drawings, a protector 30 according to an embodiment of the present invention with a sensor will be described.

Figure 10:
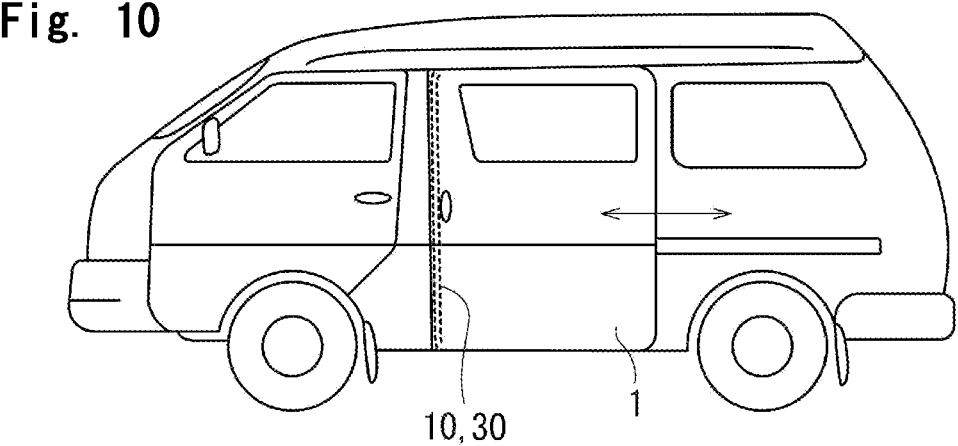
FIG. 10 is a side view of an automobile with a sliding door that opens and closes a door opening of an automobile body of an automobile.
Figure 12:
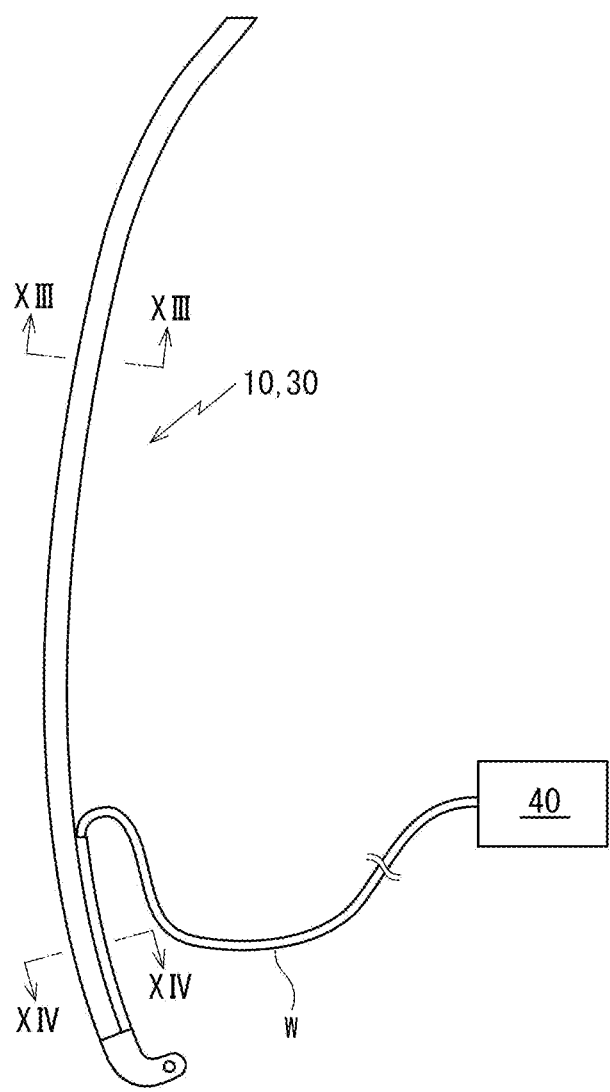
FIG. 12 is a side view of a protector illustrated in FIG. 10 with a sensor.

The protector 30 couples to a flange F of a sliding door 1 of an automobile. The flange F protrudes toward a front part of an automobile body of the automobile from a front edge of the sliding door 1. The sliding door 1 moves between at least two positions to open and close an opening of the automobile body illustrated in FIG. 10. A sensor (pressure sensitive sensor) S is fixed in the protector 30 and detects an electric signal which provides an indication that the object is in the opening. The object includes part of a human body, e.g. fingers, hands, or legs between the sliding door 1 (may also be front door or side door) and the opening. The protector 30 and a conventional protector share the configuration illustrated in FIGS. 12 to 14 in common. The protector 30 differs from the conventional protector in configuration of an insert 50 of this embodiment and a conventional insert 26. When constituents or items correspond to those in prior arts, the same symbols are used. The "electric signal" includes a change by short between the two core wires, and a change in capacitance.

Figure 13:
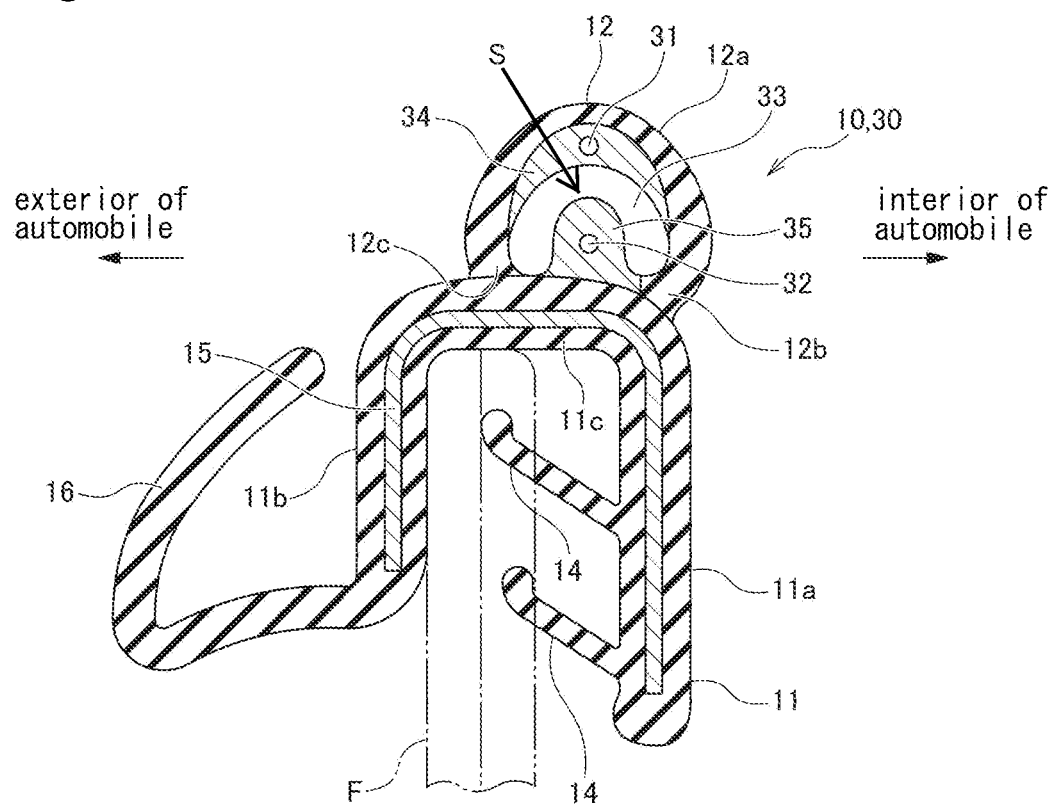
FIG. 13 is an enlarged cross-sectional view taken along line XIII-XIII of FIG. 12.
Figure 14:
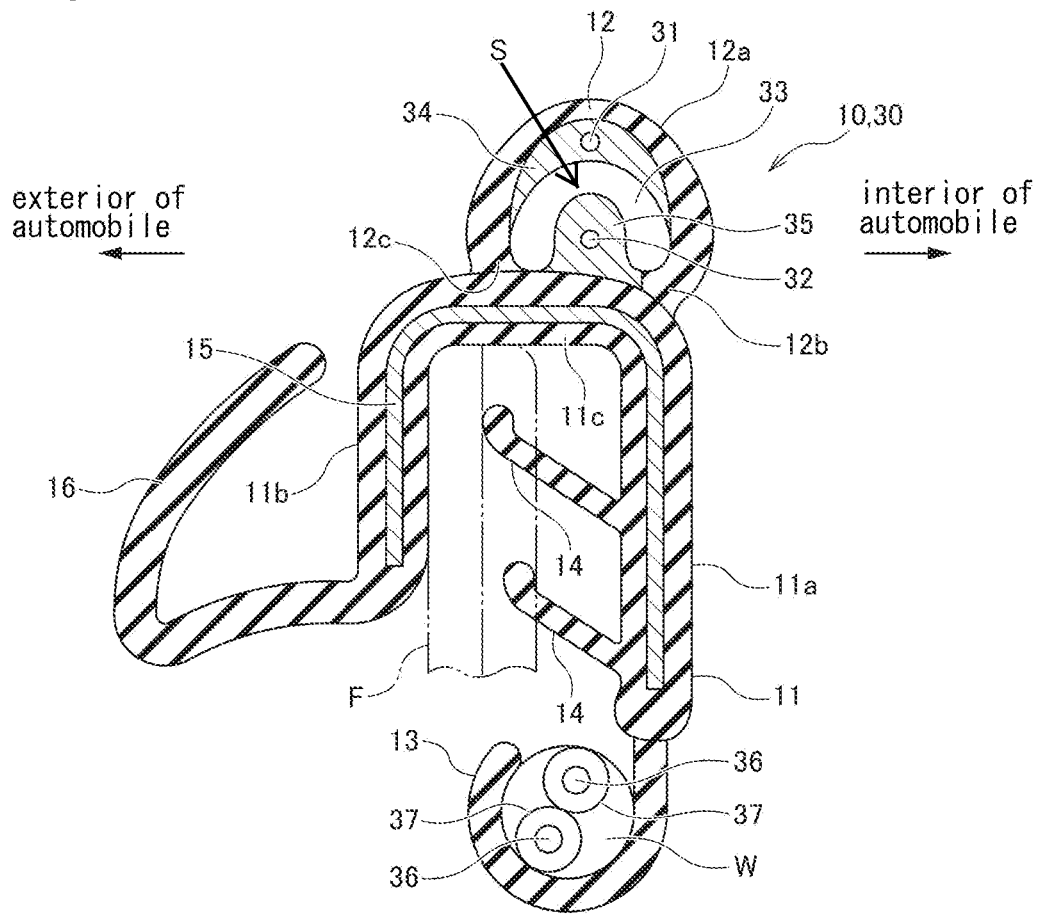
FIG. 14 is an enlarged cross-sectional view taken along line XIV-XIV of FIG. 12.
Figure 15:
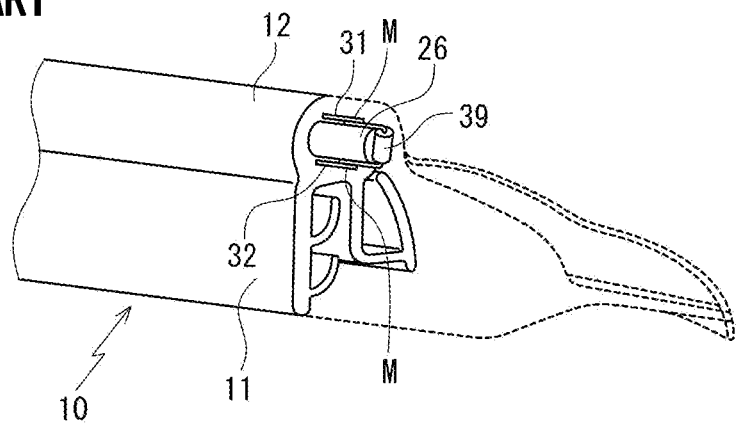
FIG. 15 is a schematic perspective view of the components of an upper terminal part subjected to die molding of a conventional protector with a sensor.
Figure 16:
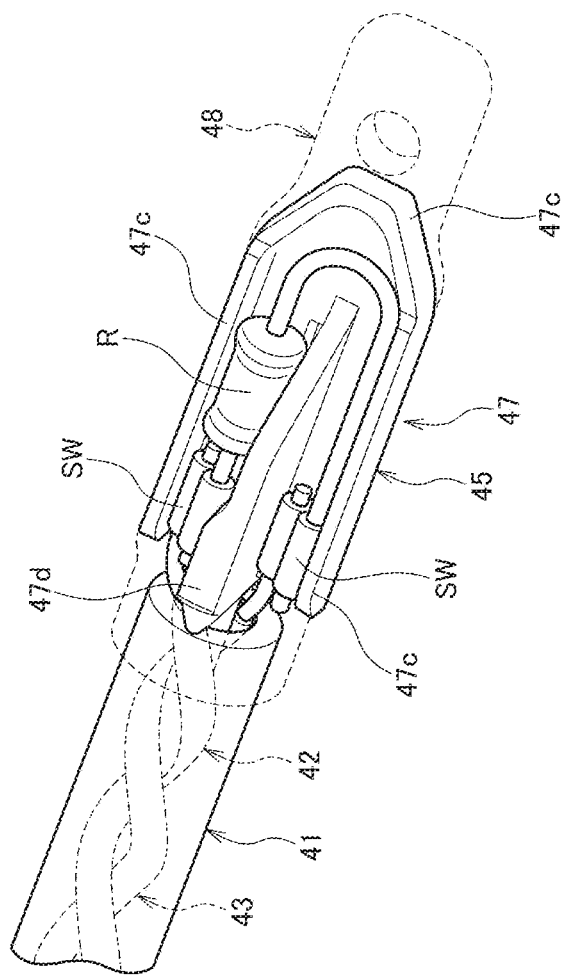
FIG. 16 is a schematic perspective view of the components of a terminal part of another conventional protector with a sensor.
Figure 17A:
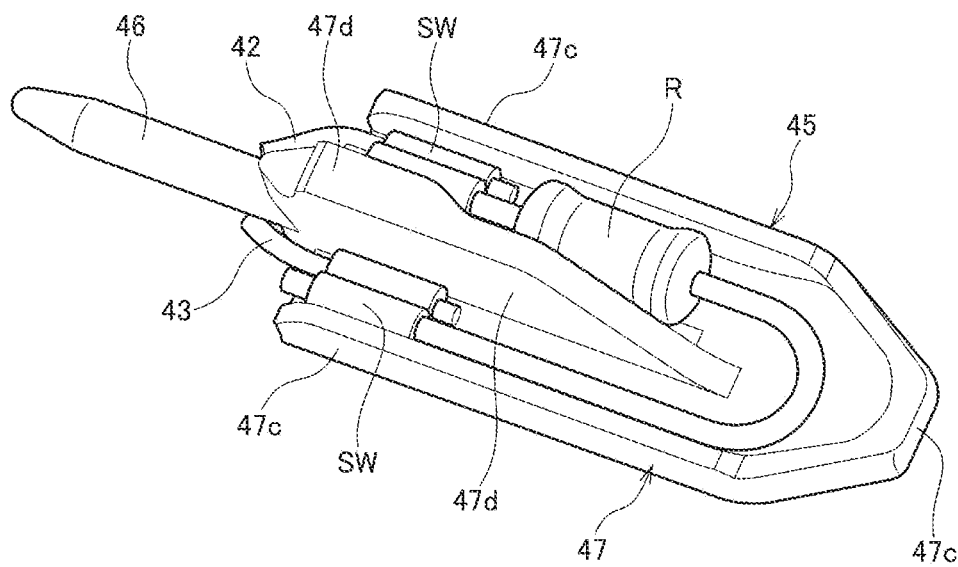
FIG. 17A is an enlarged perspective view of a surface of a first separator illustrated in FIG. 16 with the resistor stored.
Figure 17B:
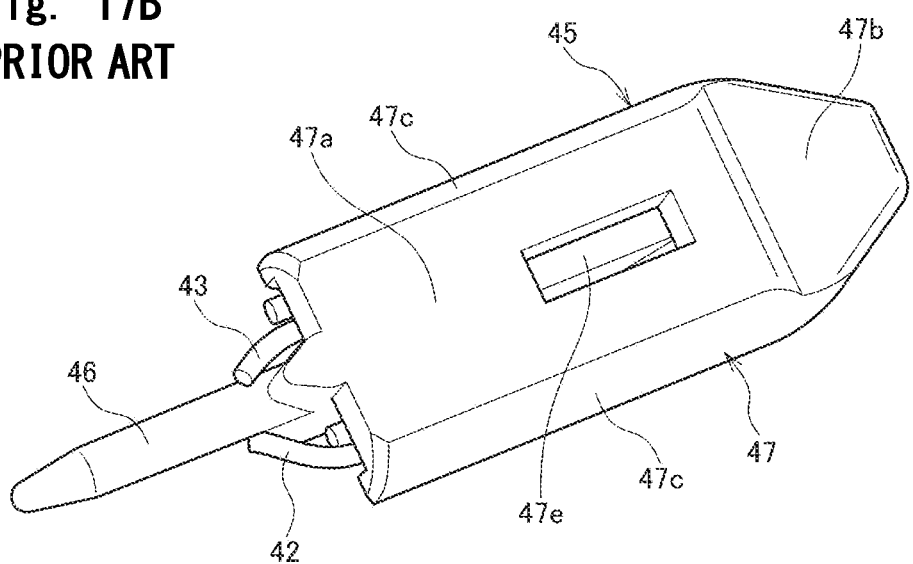
FIG. 17B is an enlarged perspective view of the back of the first separator.
Figure 18A:
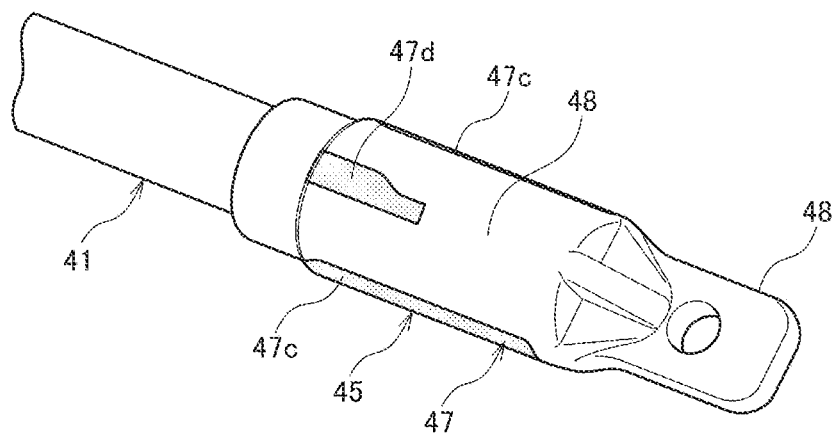
FIG. 18A is a schematic perspective view of the components on a surface of a terminal part subjected to die molding of the protector illustrated in FIG. 16.
Figure 18B:
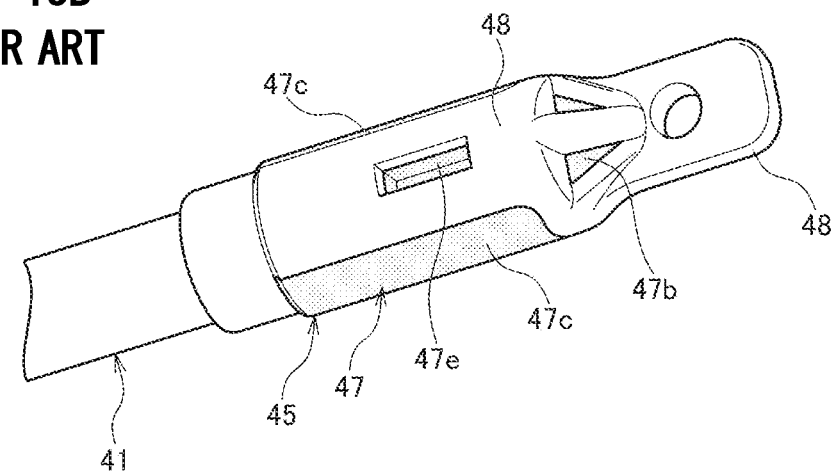
FIG. 18B is a schematic perspective view of the components on the back of the terminal part.
Figure 19:
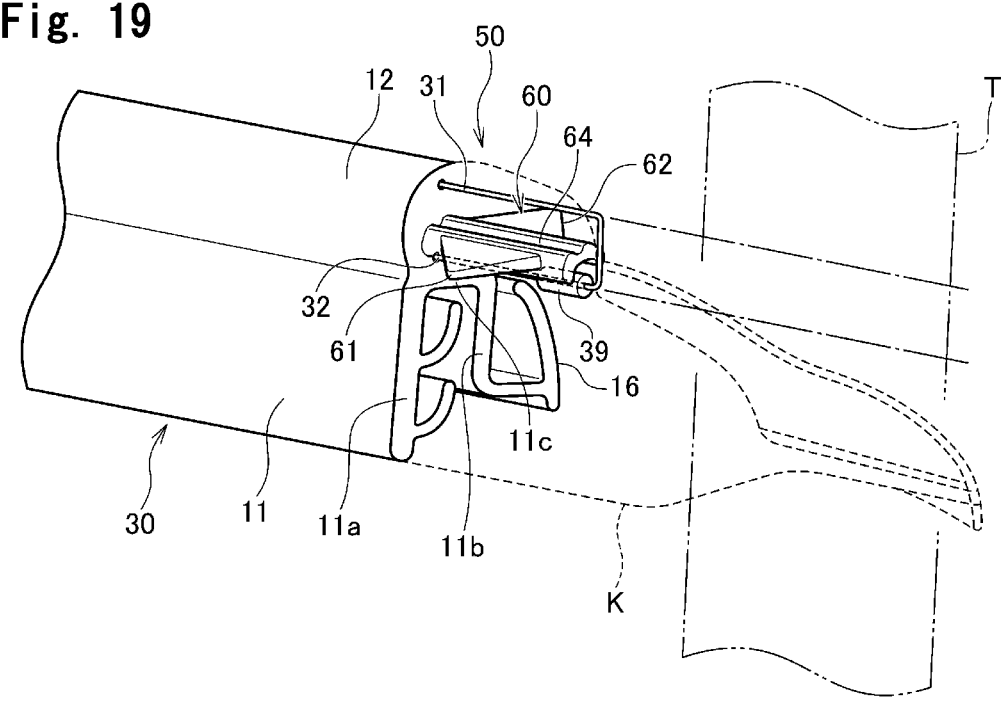
FIG. 19 is a perspective view of the principal components of an upper terminal part of the protector according to another embodiment of the present invention with a sensor.
Figure 20:
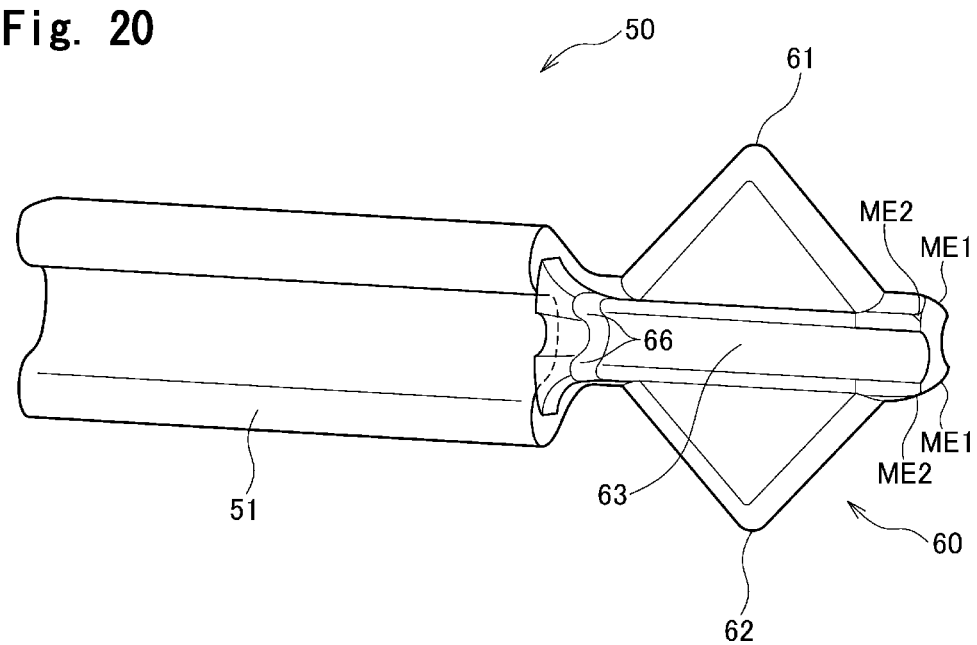
FIG. 20 is an enlarged perspective view of an insert of the protector illustrated in FIG. 19.

The protector 30 includes an installation base member 11, a hollow part 12, and the sensor S in the same manner as a conventional protector 10 illustrated in FIGS. 13 and 14.

The installation base member 11 directly couples to the flange F. The hollow part 12 is integrally formed with the installation base member 11. The hollow part 12 makes contact with the object when the object including the finger is disposed between a front end surface of the sliding door 1 and the opening. The front end surface faces the opening. The sensor S is fixed in the hollow part 12 and detects the electric signal which provides the indication that the object is in the opening. The hollow part 12 has two core wires, or electrode wires including stranded wires, 31, 32, rubber like elastic bodies 34, 35, and a space 33. The core wires 31, 32 extend in an upper and lower direction, or a direction parallel to the peripheral edge of the opening, and are embedded in the rubber like elastic bodies 34, 35. The rubber like elastic bodies 34, 35 have conductivity. The space 33 is positioned between the rubber like elastic bodies 34, 35. The installation base member 11 has a plurality of holding lips 14, 14 formed inside and a core 15 embedded. The core 15 has a substantially U-shaped cross section and increases rigidity of the installation base member 11. In addition, a seal 16, which has a shape of a lip, is formed on an outer-cabin side wall 11b of the installation base member 11. In some embodiments, the seal 16 is hollow.

As illustrated in FIG. 1, an insert 50 fills up the space 33 in an upper terminal part of the protector 30. The space 33 is open in the upper terminal part. The automobile has the sliding doors 1 on the right and on the left. FIG. 1 illustrates the upper terminal part of the protector 30 that couples to the flange F on the front edge of the sliding door 1 on the right of the automobile. A dotted line in FIG. 1 indicates the die-molded part.

Figure 2:
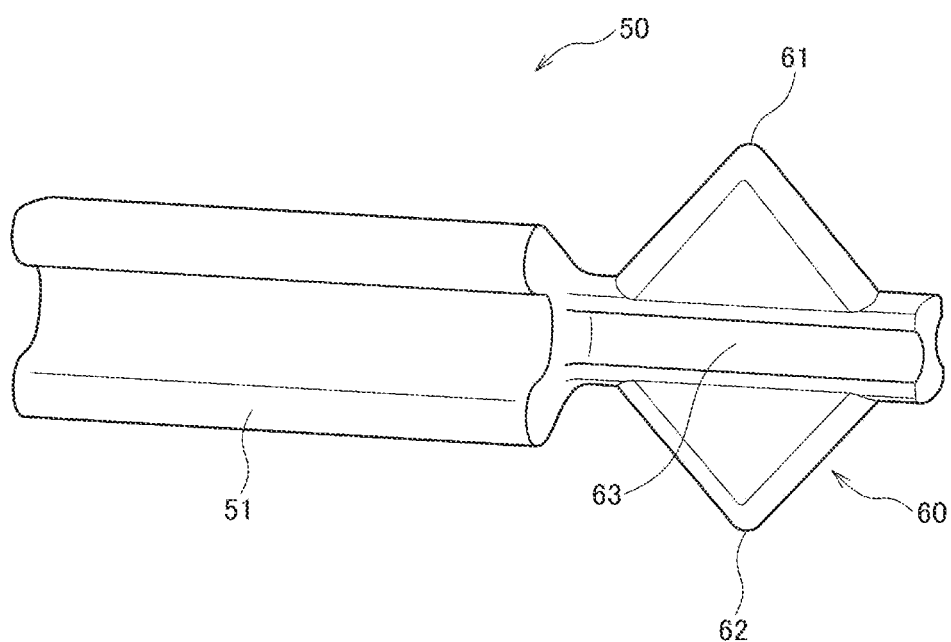
FIG. 2 is an enlarged perspective view of an insert of the protector illustrated in FIG. 1.

Examples of non-conductive material usable as the insert 50 include polypropylene, polyethylene, polyethylene terephthalate, nylon, 6 nylon, 6-6 nylon, TPO, and TPS. As illustrated in FIGS. 2 and 3, the insert 50 includes an insertion part 51 on a first end and an insulator 60 on a second end. The insertion part 51 has a U-shaped cross section.

The insertion part 51, which is inserted in the space 33, has a cross-sectional shape that is substantially the same as or a little larger than the space 33, to fill up the space 33 tightly and to eliminate decline in sensor function caused by die-molding material flowing in the space 33 during die molding.

Figure 3A:
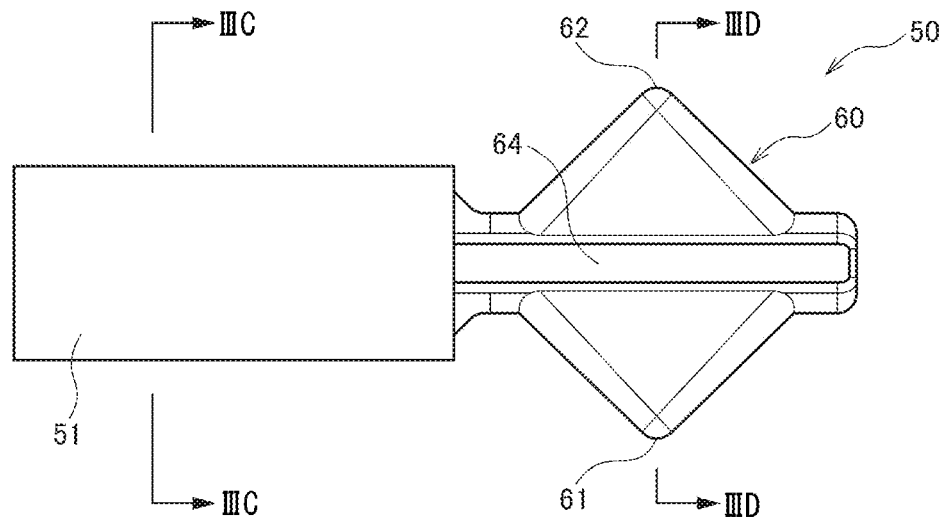
FIG. 3A is an enlarged front view of the insert of the protector illustrated in FIG. 1.
Figure 3B:
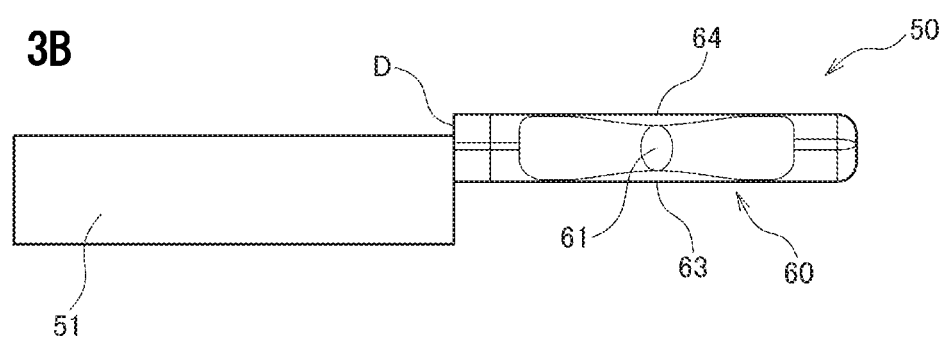
FIG. 3B is an enlarged side view of the insert.
Figure 3C:
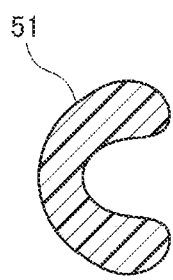
FIG. 3C is a cross-sectional view taken along line IIIC-IIIC in FIG. 3A.

The cross-sectional shape of the insertion part 51 is shaped in conformance with a cross-sectional shape of the space 33. In this embodiment, the insertion part 51 is shaped to have a U-shaped cross section as illustrated in FIG. 3C in conformance with a U-shaped cross section of the space 33. In some embodiments, the insertion part 51 is shaped to have a rectangular-shaped cross section in conformance with a rectangular-shaped cross section of the space 33.

The insulator 60 has a tabular shape, and is joined and unified with an end surface of the insertion part 51. In this embodiment, the insulator 60 has a lozenge shape. A plate surface of the insulator 60 is arranged to be parallel to a flat surface that connects bottom parts on both ends of the insertion part 51. When the insertion part 51 is inserted in the space 33, as illustrated in FIGS. 1 and 4B, the plate surface of the insulator 60 extends in a right and left direction with a right side end 62 and a left side end 61 of the insulator 60 extending toward the right and left direction. The right and left direction meets at right angles with a flat surface T. The flat surface T connects centers of the first and second core wires 31, 32 in cross section. The first and second core wires 31, 32 extend in the direction parallel to the peripheral edge of the opening in a terminal part of the extrusion-molded part. The arrangement of the insulator 60 is not limited.

In this embodiment, the flat surface T extends in a front and rear direction of the automobile body, and the plate surface of the lozenge shape that meets at right angles with the flat surface T extends in an inner-cabin and outer-cabin direction. A plate thickness of the lozenge shape extends in the front and rear direction. In this embodiment, the insulator 60 has an inner-cabin side end 61 as the left side end and an outer-cabin side end 62 as the right side end.

The insulator 60 has an outer surface and an inner surface. The outer surface is further from the installation base member 11, or closer to a front part of the automobile body, than the inner surface. As illustrated in FIG. 3B, the outer surface of the insulator 60 is closer to an outer side part than an outer surface of the first end of the insert 50 by a distance D. The distance D functions as a stopper of the insert 50 when the insertion part 51 is inserted in the hollow part 12.

Figure 3D:
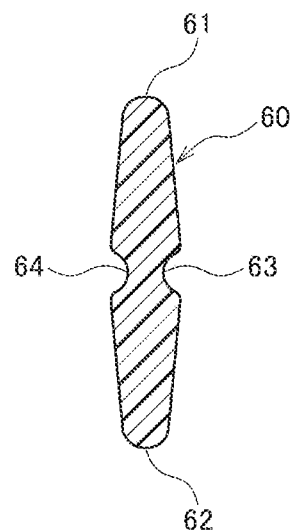
FIG. 3D is a cross-sectional view taken along line IIID-IIID in FIG. 3A.

As illustrated in FIG. 3D, the inner surface of the insulator 60 closer to the installation base member 11, or closer to a rear part of the automobile body, has a concave part 63 to position a resistor 39. The concave part 63 simplifies positioning of the resistor 39.

Figure 4A:
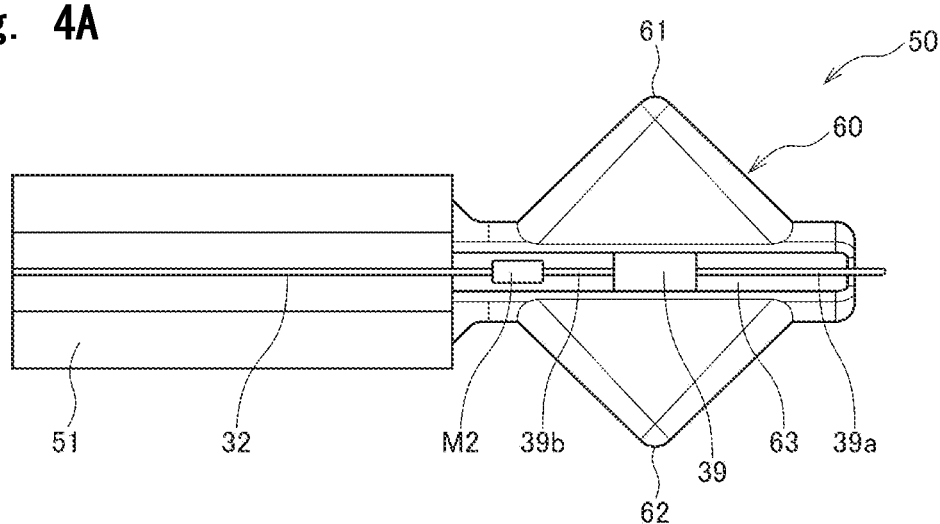
FIG. 4A is an enlarged bottom view of the protector illustrated in FIG. 1 with a resistor attached to the insert.
Figure 4B:
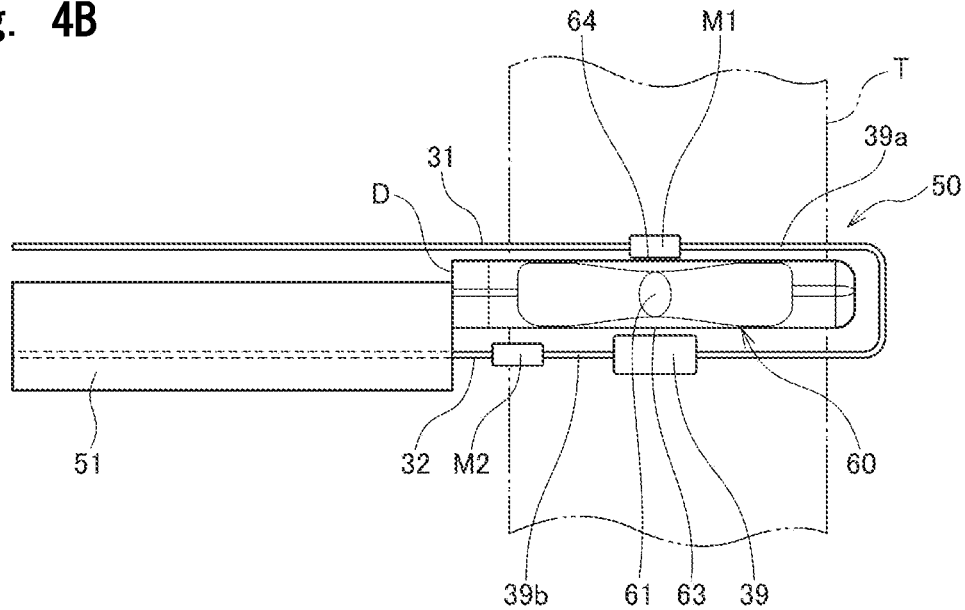
FIG. 4B is an enlarged side view of the protector.

More specifically, as illustrated in FIGS. 4A and 4B, the resistor 39, which is positioned on the inner surface of the insulator 60 closer to the rear part of the automobile body, has first and second legs 39a, 39b. The first leg 39a is piled on the first core wire 31 on a first wire connection part M1 on the outer surface of the insulator 60 closer to the front part of the automobile body. The second leg 39b is piled on the second core wire 32 on a second wire connection part M2 on the inner surface of the insulator 60 closer to the rear part of the automobile body. The first and second core wires 31, 32 are drawn out from the extrusion-molded part in the terminal part of the extrusion-molded part, and extend in the direction parallel to the peripheral edge of the opening. The extrusion-molded part includes the installation base member 11 and the hollow part 12, which are integrally formed by extrusion molding. The first leg 39a is piled on the first core wire 31, and the second leg 39b is piled on the second core wire 32, and are connected by resistance welding or soft soldering. The first wire connection part M1 is positioned on a concave part 64 on the outer surface of the insulator 60 closer to the front part of the automobile body.

The insertion part 51 on the first end of the insert 50 is inserted in the hollow part 12. Die-molding material K covers the insulator 60, the first and second core wires 31, 32, the resistor 39, the first and second legs 39a, 39b, and the first and second wire connection parts M1, M2 on the second end of the insert 50.

Figure 5:
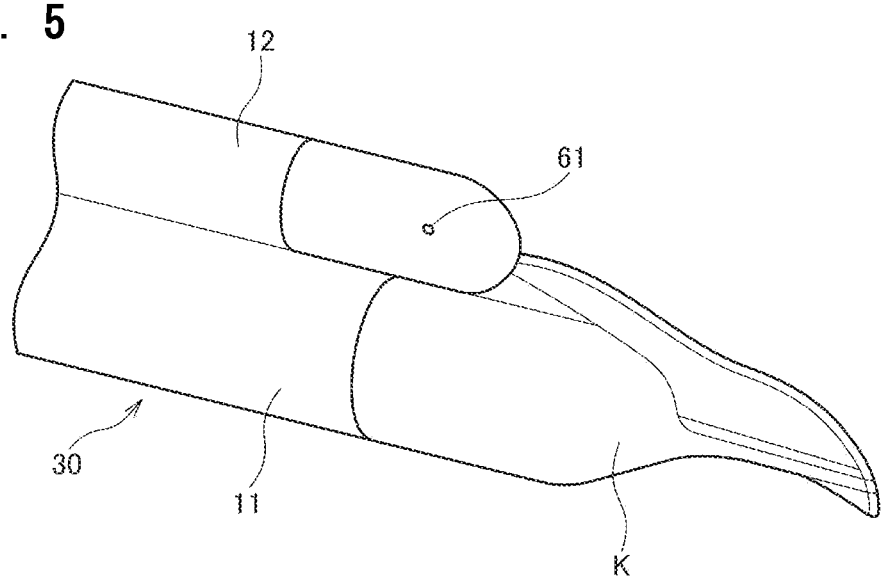
FIG. 5 is a perspective view of an appearance of the upper terminal part of the protector according to the embodiment of the present invention.

As illustrated in FIG. 5, the insulator 60 has merely the inner-cabin side end 61 and the outer-cabin side end 62 exposed from a part covered with the die-molding material K.

The inner-cabin side end 61 as the left side end and the outer-cabin side end 62 as the right side end, which protrude toward inner-cabin and outer-cabin side ends of the insulator 60 and are exposed from the part covered with the die-molding material K, are hardly noticeable from the exterior and do not spoil appearance. FIG. 5 illustrates only the inner-cabin side end 61, which is visible.

An upper terminal part of the protector 30 is manufactured by die molding by the following steps. First, the first and second wire connection parts M1, M2 are prepared.

Next, the insertion part 51 is inserted in the hollow part 12 threading its way through a space between the first and second core wires 31, 32 with the plate surface of the tabular insulator 60 meeting at right angles with the flat surface T. The plate surface extends in the right and left direction. The flat surface T includes the first and second core wires 31, 32, which extend in the direction parallel to the peripheral edge of the opening in the terminal part of the extrusion-molded part.

More specifically, the first leg 39a and the first core wire 31, connected with each other on the first wire connection part M1, and the second leg 39b and the second core wire 32, connected with each other on the second wire connection part M2, are bent slightly toward an exterior or an interior of the automobile (illustration omitted) keeping the positional relation of these members unchanged. In other words, a distance among these members is maintained after these members are bent.

Bending the first leg 39a and the first core wire 31, connected with each other on the first wire connection part M1, and the second leg 39b and the second core wire 32, connected with each other on the second wire connection part M2 keeps the first and second core wires 31, 32, the first and second wire connection parts M1, M2, the first and second legs 39a, 39b, and the resistor 39 away from the hollow part 12 (illustration omitted), to prevent these from coming into contact with or interfering the insert 50 while the insertion part 51 is being inserted in the hollow part 12.

After the insertion part 51 is inserted in the hollow part 12, the first leg 39a and the first core wire 31, connected with each other on the first wire connection part M1, and the second leg 39b and the second core wire 32, connected with each other on the second wire connection part M2 are untwisted. Finally, the resistor 39 is positioned on a desired part of the concave part 63.

Figure 6:
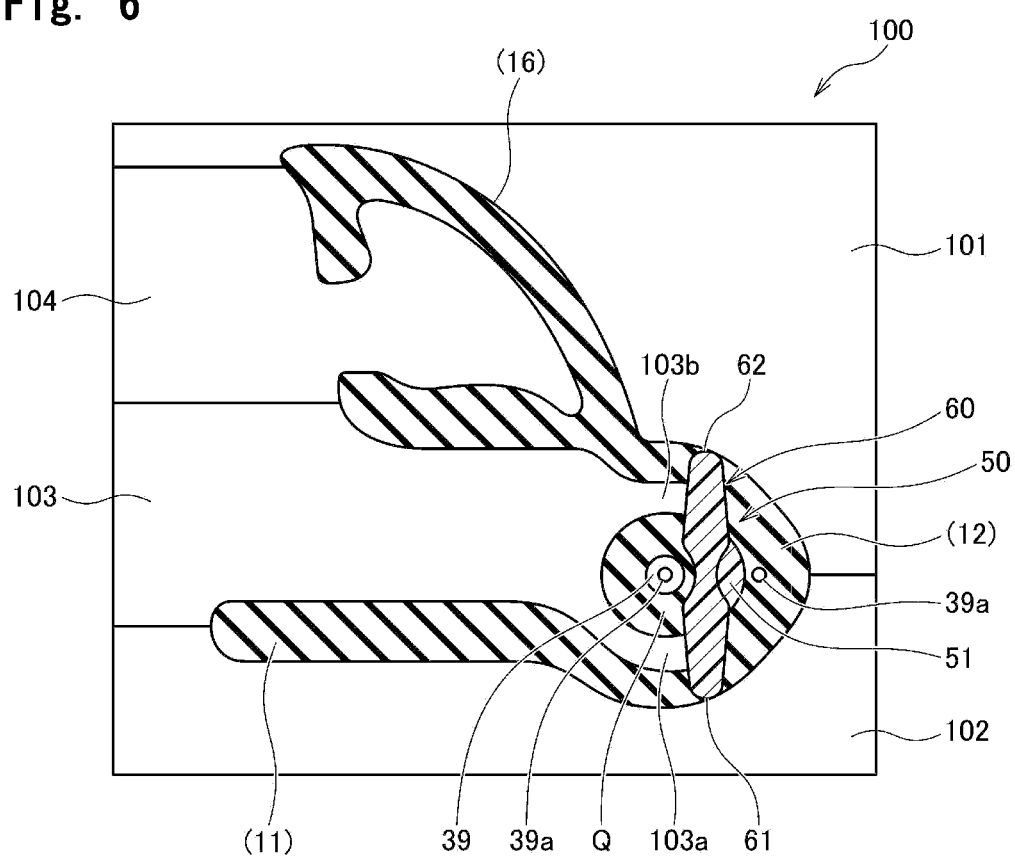
FIG. 6 is a cross-sectional view of a die used to manufacture the protector according to the embodiment of the present invention.

Next, the upper terminal part of the protector 30 is positioned on a die 100 illustrated in FIG. 6 with the insertion part 51 inserted. The die 100 includes an upper die 101, a lower die 102, an inner die 103, and a slide die 104. The inner die 103 and the slide die 104 are sandwiched between the upper and lower dies 101, 102.

The upper terminal part of the protector 30 is positioned between the upper die 101 and the lower die 102 with the inner-cabin side end 61 as the left side end abutted on the inner surface of the lower die 102 and the outer-cabin side end 62 as the right side end abutted on the inner surface of the upper die 101.

Next, the inner die 103 and the slide die 104 are inserted between the upper die 101 and the lower die 102.

The inner die 103 has first and second projections 103a, 103b. Top ends of the first and second projections 103a, 103b are abutted on the inner surface of the insulator 60. Base roots of the first and second projections 103a, 103b form a U-shape on an inner side. The resistor 39 is positioned between the first and second projections 103a, 103b with an entire circumference of a second leg 39b of the resistor 39 surrounded by a space Q. The space Q, which surrounds the entire circumference of the second leg 39b, keeps the second leg 39b away from the insulator 60 and the first and second projections 103a, 103b.

The slide die 104 is inserted between the upper die 101 and the inner die 103, and is used to form a die-molded part that is continuous with the seal 16, which is formed by extrusion molding and has the shape of the lip.

Next, the die-molding material K is poured into the space Q. FIG. 5 illustrates the terminal part, which is formed by die molding and released from the die 100. The inner-cabin side end 61 as the left side end abutted on the lower die 102 and the outer-cabin side end 62 as the right side end abutted on the upper die 101 do not come into contact with the die-molding material K and are exposed from the part covered with the die-molding material K.

The top ends of the first and second projections 103a, 103b abut on parts of the inner surface of the insulator 60, and keep the parts away from the die-molding material K. The parts abutted by the first and second projections 103a, 103b are exposed, but are at the back of the part covered with the die-molding material K and are concealed from the surface of the die-molded part. This allows merely the inner-cabin side end 61 as the left side end and the outer-cabin side end 62 as the right side end to be visible from the exterior when the protector 30 couples to the automobile.

Material of the insert 50 and material of the die-molding material K may be similar in hardness and have flexibility. In some embodiments, the insert 50 is made of PP and the die-molding material K is made of TPO.

This allows the insert 50 and the die-molding material K, as bonded together, to yield sense of integrity, and the protector 30 to be easier to handle. The insert 50 and the die-molding material K preferably have a hardness that falls within a range of 20 to 90 JISA, which is soft, of Japan Industrial Standards (JIS), and more preferably in a range of 40 to 90 JISA. If the hardness is less than 40 JISA, the die-molded part can perform an insufficient function (including assemblability to the automobile body). If the hardness is less than 20 JISA, the die-molded part performs the insufficient function. In some embodiments, the insert 50 is covered with another resin material including adhesive to prevent infiltration of water into inner electric components or wiring. In this modification, the other resin material, which is as soft as or softer (lower in hardness) than the die-molding material K, does not hamper the sense of integrity.

In some embodiments, the material of the insert 50 and the material of the die-molding material K have compatibility. This allows the insert 50 and the die-molding material K to yield the sense of integrity, and the protector 30 to be easier to handle. If the insert 50 is to be covered by the other resin material including adhesive to prevent infiltration of water, the compatibility simplifies selection of the adhesive to bond with the insert 50 and the die-molding material K firmly. In some embodiments, the material of the insert 50 and the material of the die-molding material K are so similar in property as to fuse. This allows the insert 50 to adhere to the die-molding material K closely during die molding without using adhesive, and prevents infiltration of water into the inner electric components or wiring. It is to be noted that "compatibility" in a narrow sense indicates that the material of the insert 50 and the material of the die-molding material K are so similar in property as to fuse. When one material is TPO, the other material is polypropylene, polyethylene, TPO, or TPE, which includes olefinic resin. Examples of TPE, which includes olefinic resin, include thermoplastic styrenic elastomer (TPS). When one material is TPS under the condition that TPS includes olefinic resin, the other material is compatible with the TPS and so similar in property as to weld or fuse like the aforementioned TPO. In this modification, the die-molding material K may be foamed material or non-foamed material.

In this embodiment, the die-molding material K covers the insulator 60, the first and second core wires 31, 32, the resistor 39, the first and second legs 39a, 39b, and the first and second wire connection parts M1, M2 on the second end of the insert 50. The insulator 60, which has the tabular shape, reduces the thickness, or dimension, covered with the die-molding material K. This prevents thermal shrinkage after die molding from spoiling appearance, including sink marks on an outer surface. In addition, the insulator 60, which has the tabular shape, is simple in configuration and reduces volume. Also, the insulator 60 is easier to hold for die-molding operators and improves operability.

In addition, the insulator 60 has merely the inner-cabin side end 61 as the left side end and the outer-cabin side end 62 as the right side end exposed from the part covered with the die-molding material K. This configuration improves appearance of the protector. In addition, the inner die 103 as well as the lower die 102 in contact with the inner-cabin side end 61 as the left side end and the upper die 101 in contact with the outer-cabin side end 62 as the right side end support the insulator 60 under the die molding, to achieve stable die molding of the insulator 60.

Figure 7:
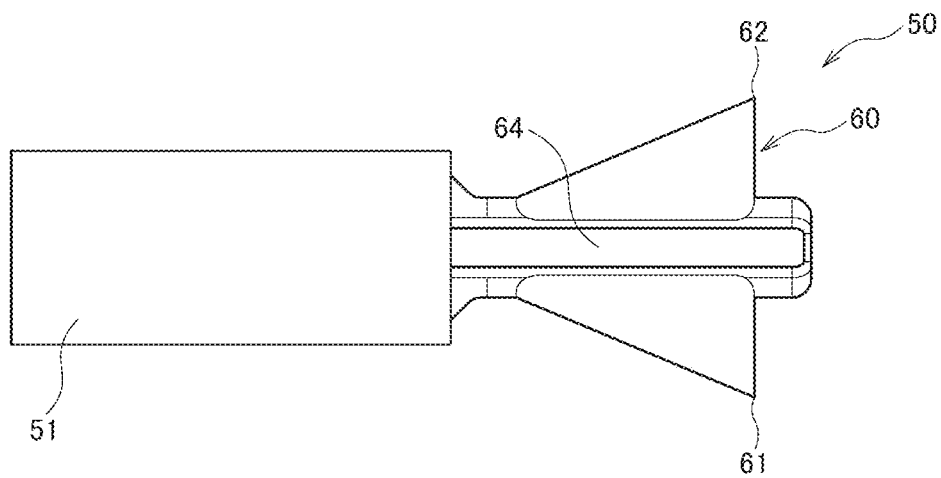
FIG. 7 is an enlarged front view of an insert of the protector according to another embodiment of the present invention.

While in this embodiment, the insulator 60 has the lozenge shape, the shape of the insulator 60 is not limited. In this embodiment, it is only required that the insulator 60 has the tabular shape. In some embodiments, the insulator 60 has a polygonal shape, e.g. a triangular shape as illustrated in FIG. 7 and a hexagonal shape (illustration omitted), a circular shape (illustration omitted), or an elliptic shape (illustration omitted). But, the insulator 60 preferably has the lozenge shape or the triangular shape of which smaller number of parts come into point contact with the upper die 101 and the lower die 102. This is because smaller amount of the insulator 60, which comes into contact with the upper die 101 and the lower die 102, reduces the amount exposed from the surface of the protector 30 after die molding.

Figure 8:
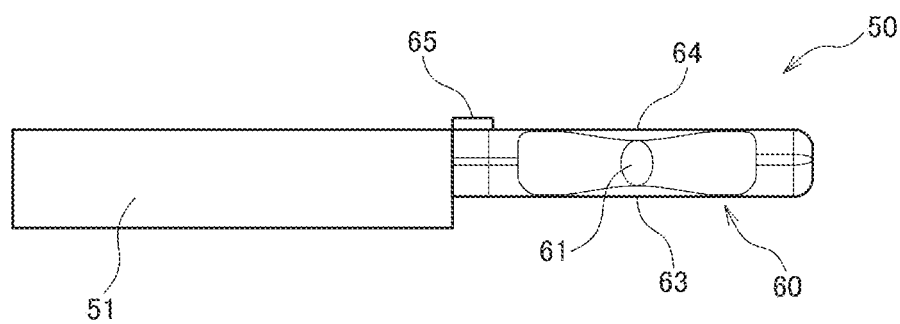
FIG. 8 is an enlarged side view of an insert of the protector according to still another embodiment of the present invention.

In this embodiment, as illustrated in FIG. 3B, the outer surface of the insulator 60 is closer to the outer side part than the insertion part 51 on the first end of the insert 50 by the distance D. The arrangement of the insulator 60 is not limited. In some embodiments, as illustrated in FIG. 8, the outer surface of the insulator 60 is flush with the outer surface of the first end of the insert 50, the insert 50 includes a first protrusion 65 on a connection part between the insertion part 51 and the insulator 60, and the first protrusion 65 is closer to the outer side part than the outer surface of the insulator 60.

In some embodiments, as illustrated in FIG. 19 to FIG. 22B, the resistor 39 is arranged on a different position, the insulator 60 is altered in the shape of an end part, or the insert 50 includes a second protrusion 66.

In this embodiment, as illustrated in FIG. 1 to FIG. 4, the resistor 39 is positioned at the center on the inner surface of the insulator 60 closer to the rear part of the automobile body. In some embodiments, as illustrated in FIG. 19 to FIG. 22B, the resistor 39 is positioned close to the top end on the inner surface of the insulator 60 closer to the rear part of the automobile body. This leaves a space necessary for the wire connections on the first and second wire connection parts M1, M2, shortens the distance by which the two core wires 31, 32 are bared, and prevents unnecessary enlargement of the die-molded part.

Figure 9:
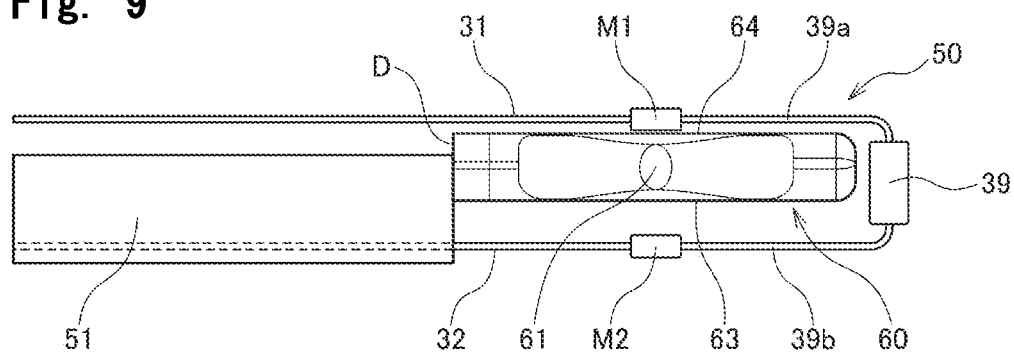
FIG. 9 is an enlarged side view of the protector according to the embodiment of the present invention with the resistor attached to another part of the insert.

In some embodiments, the resistor 39 is positioned on the outer surface of the insulator 60 closer to the front part of the automobile body, or as illustrated in FIG. 9, on an outer side part relative to a side of the insulator 60, that is an outer side part relative to the end part of the second end of the insert 50.

Figure 21A:
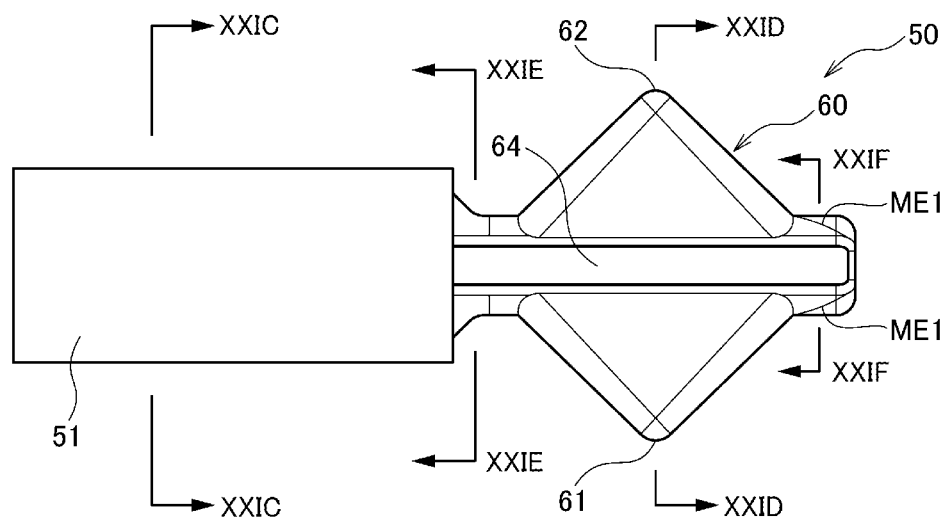
FIG. 21A is an enlarged front view of the insert of the protector illustrated in FIG. 19.
Figure 21B:
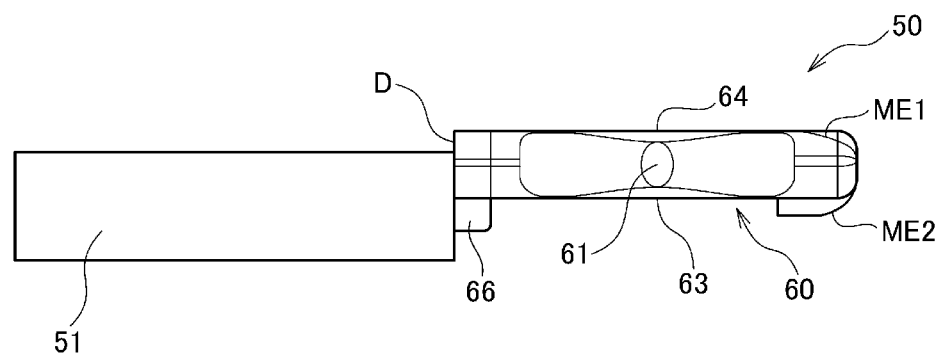
FIG. 21B is an enlarged side view of the insert.
Figure 21C:
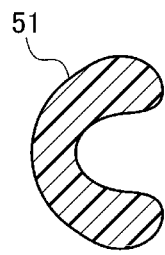
FIG. 21C is a cross-sectional view taken along line XXIC-XXIC in FIG. 21A.
Figure 21D:
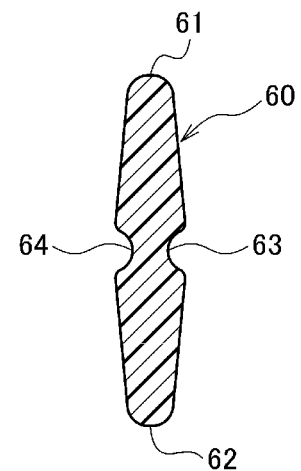
FIG. 21D is a cross-sectional view taken along line XXID-XXID in FIG. 21A.
Figure 21E:
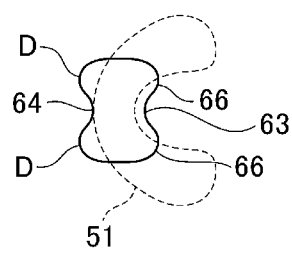
FIG. 21E is a cross-sectional view taken along line XXIE-XXIE in FIG. 21A.
Figure 21F:
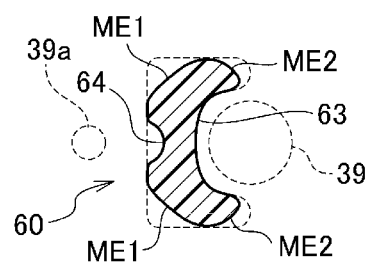
FIG. 21F is a cross-sectional view taken along line XXIF-XXIF in FIG. 21A.
Figure 22A:
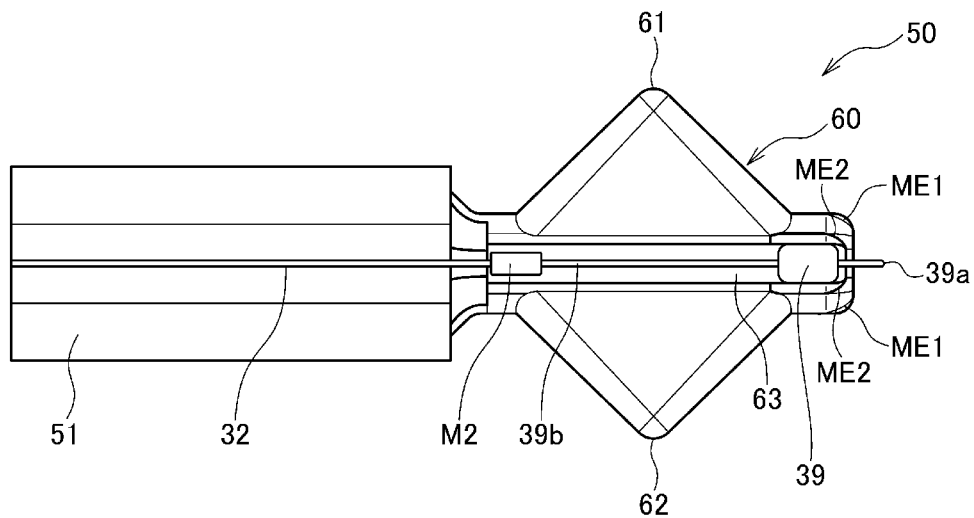
FIG. 22A is an enlarged bottom view of the protector illustrated in FIG. 19 with a resistor attached to the insert.
Figure 22B:
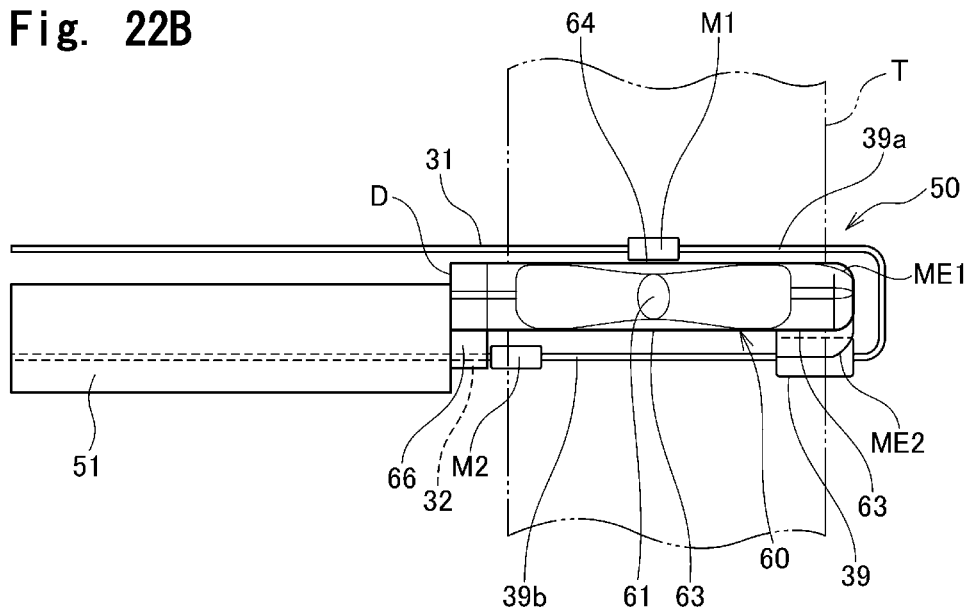
FIG. 22B is an enlarged side view of the protector.

In addition, as illustrated in FIG. 21F, the end part of the insulator 60 has a first chamfer ME1 made on an outer side part and a second chamfer ME2 made on an inner side part.

The first and second chamfers ME1 and ME2 prevent the end part of the insulator 60 from coming into contact with or interfering the resistor 39 while the resistor 39 is being positioned on the desired part of the concave part 63 close to the top end on the inner surface of the insulator 60 closer to the rear part of the automobile body. This prevents degradation in operability.

As illustrated in FIGS. 21B and 21E, the second protrusion 66 draws the insulator 60 as the second end of the insert 50 toward the inner side part relative to the insertion part 51 as the first end. The insert 50 includes the second protrusion 66 on the connection part between the insertion part 51 and the insulator 60. The second protrusion 66 is closer to the inner side part than the inner surface of the insulator 60. The second protrusion 66 as well as the distance D or the first protrusion 65 illustrated in FIG. 8 functions as a stopper of the insert 50 when the first end of the insert 50 is inserted in the hollow part 12, and simplifies positioning of the insert 50.

This configuration prevents the first end of the insert 50 from advancing too deep inside the space when the first end is inserted from an end of the extrusion molded part and positions the insert 50 on an appropriate position.

In this modification, the insert 50 may have at least one of the distance D and the second protrusion 66. Also, the insert 50 may have at least one of the first protrusion 65 illustrated in FIG. 8 and the second protrusion 66.

In this embodiment, the inner die 103 allows the die-molding material K to surround the entire circumference of the resistor 39. In some embodiments, the resistor 39 adheres to and is fixed on the insulator 60, and the die-molding material K does not flow into the space between the resistor 39 and the insulator 60.

In some embodiments, two pins (illustration omitted) substitute the first and second projections 103a, 103b. In this modification, the two pins are arranged on the inner surface of the insulator 60 to extend toward the inner side, sandwich the second leg 39b in a contactless manner, and are die molded.

In this embodiment the protector 30 couples to the flange F of the sliding door 1, which moves between at least two positions. In some embodiments, the protector 30 couples to the flange F of the opening and the sensor S outputs the corresponding signal upon detecting the object between the opening and the sliding door 1.

Figure 11:
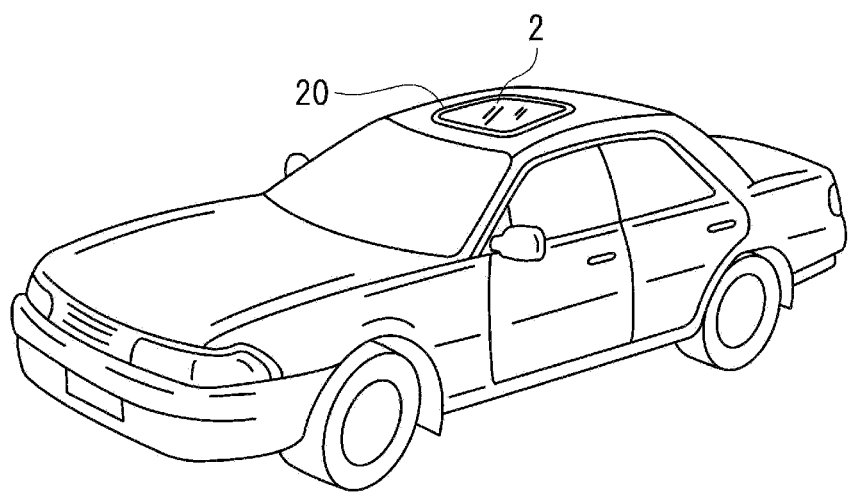
FIG. 11 is a perspective view of an automobile with a sunroof.

In some embodiments, the protector 30 couples to the flange F of a back door (illustration omitted) or the flange F of a sunroof 2 illustrated in FIG. 11.

We claim:

1. A protector with a sensor, the protector comprising:
   an installation base member configured to be operably coupled to a flange of at least one of a peripheral edge of a panel of an automobile or a peripheral edge of a door opening of an automobile body of the automobile, the panel being movable between at least two positions to open and close the opening; and
   a hollow part unified with the installation base member, the hollow part having a tube shape and including first and second core wires, first and second conductive parts, and a space, each of the first and second conductive parts having a respective one of the first and second core wires embedded therein, and the space being positioned between the first and second conductive parts; and
   an insert made of a non-conductive material and having a first end and a second end,
   wherein:
   the installation base member and the hollow part are components of an extrusion molded part,
   the hollow part is configured to allow the first and second conductive parts to move toward each other when an object is disposed between the panel and the opening and makes contact with the hollow part when the panel is moved towards a closed position, such that an electric signal provides an indication that the object is in the opening,
   in a terminal part of the extrusion-molded part, the first and second core wires extend in a direction parallel to the peripheral edge of the opening, and the first and second core wires are connected with first and second legs of a resistor,
   in the terminal part of the extrusion-molded part, the first end of the insert is inserted in the space of the hollow part to fill up the space in the terminal part of the extrusion-molded part,
   the second end of the insert includes an insulator configured to insulate a first wire connection part where the first leg of the resistor is connected to the first core wire, from a second wire connection part where the second leg of the resistor is connected to the second core wire, in the terminal part of the extrusion-molded part, die-molding material covers the insulator, the first and second core wires, the resistor, the first and second legs, and the first and second wire connection parts on the second end of the insert, the insulator has a tabular shape including a plate surface that is shaped as a lozenge and extends in a leftward and rightward direction, the plate surface of the insulator has a left side end which protrudes in the leftward direction at a left side of the insulator and a right side end which protrudes in the rightward direction at a right side of the insulator, and the leftward direction and the rightward direction are at right angles to a plane that intersects both of the first and second core wires and extends in a same direction as the first and second core wires, and the left side end and the right side end of the insulator are exposed from the die-molding material to be visible from an exterior of the protector.

2. The protector as claimed in claim 1, wherein the insulator has an outer surface and an inner surface closer to the installation base member than the outer surface, and the inner surface has a concave part to position the resistor.

3. The protector as claimed in claim 2, wherein the outer surface of the insulator is closer to outside of the protector than an outer surface of the first end of the insert.

4. The protector as claimed in claim 2, wherein the outer surface of the insulator is flush with an outer surface of the first end of the insert, the insert comprises a first protrusion on a connection part between the first and second ends of the insert, and the first protrusion is closer to outside of the protector than the outer surface of the insulator.

5. The protector as claimed in claim 1, wherein the insert comprises a second protrusion on a connection part between the first and second ends of the insert, and the second protrusion is closer to an inside of the protector than the inner surface of the insulator.

6. The protector as claimed in claim 1, wherein the space of the hollow part has a substantially U-shaped cross section with an opening of the U-shaped cross section facing the installation base member, and the first end of the insert has substantially the same shape as the space of the hollow part.

7. The protector as claimed in claim 2, wherein the space of the hollow part has a substantially U-shaped cross section with an opening of the U-shaped cross section facing the installation base member, and the first end of the insert has substantially the same shape as the space of the hollow part.

8. The protector as claimed in claim 3, wherein the space of the hollow part has a substantially U-shaped cross section with an opening of the U-shaped cross section facing the installation base member, and the first end of the insert has substantially the same shape as the space of the hollow part.

9. The protector as claimed in claim 4, wherein the space of the hollow part has a substantially U-shaped cross section with an opening of the U-shaped cross section facing the installation base member, and the first end of the insert has substantially the same shape as the space of the hollow part.

10. The protector as claimed in claim 5, wherein the space of the hollow part has a substantially U-shaped cross section with an opening of the U-shaped cross section facing the installation base member, and the first end of the insert has substantially the same shape as the space of the hollow part.

11. The protector as claimed in claim 1, wherein an end part of the insulator, which is different from the left side end and the right side end of the insulator, has a first chamfer at an outer side part thereof and a second chamfer at an inner side part thereof.

* * * * *